(12) United States Patent
Mills

(10) Patent No.: US 7,889,290 B2
(45) Date of Patent: Feb. 15, 2011

(54) ILLUMINATION DISPLAY WITH ENHANCED ILLUMINATION EDGE LIGHTING

(75) Inventor: Stephen B. Mills, Atkinson, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 127 days.

(21) Appl. No.: 12/151,383

(22) Filed: May 5, 2008

(65) Prior Publication Data

US 2009/0273730 A1 Nov. 5, 2009

(51) Int. Cl.
G02F 1/1335 (2006.01)
(52) U.S. Cl. .............................. 349/65; 349/66; 349/67; 349/73
(58) Field of Classification Search ............. 349/65–67, 349/73
See application file for complete search history.

(56) References Cited

U.S. PATENT DOCUMENTS 4,914,553 A * 4/1990 Hamada et al. ............. 362/560
5,838,405 A * 11/1998 Izumi et al. ................. 349/73
2007/0067118 A1 * 3/2007 Cooper ........................ 702/57
2009/0015756 A1 * 1/2009 Lee ............................. 349/67
2009/0279020 A1 * 11/2009 Tanabe ........................ 349/65

* cited by examiner

*Primary Examiner*—David Nelms
*Assistant Examiner*—Phu Vu
(74) *Attorney, Agent, or Firm*—Grossman Tucker; Perreault & Pfleger

(57) ABSTRACT

In general, an illumination display includes a light transmitting panel that provides enhanced illumination edge lighting. One or more light sources are optically coupled into an edge of the light transmitting panel to illuminate the light transmitting panel. The light transmitting panel refracts and reflects light such that a greater intensity of light may be emitted from one or more enhanced illumination portions, such as a raised enhanced illumination portion, of the light transmitting panel. The light source(s) may emit light of different colors corresponding to different conditions such that the illumination display indicates a condition by illuminating with the color corresponding to the condition. The illumination display may be used in various devices including, but not limited to, a device for checking the temperature of food.

16 Claims, 4 Drawing Sheets

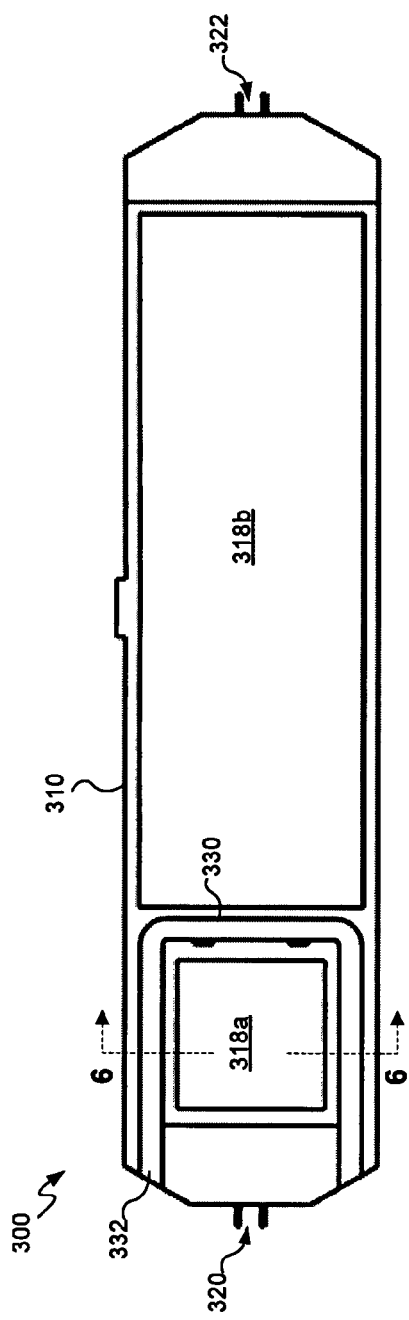
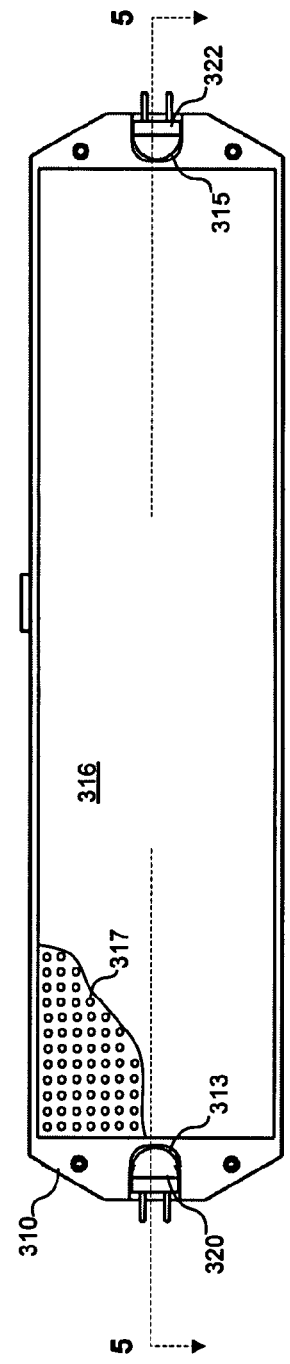
FIG. 3
FIG. 4

ILLUMINATION DISPLAY WITH ENHANCED ILLUMINATION EDGE LIGHTING

TECHNICAL FIELD

The present invention relates to displays and more particularly, to an illumination display with enhanced illumination edge lighting.

BACKGROUND INFORMATION

Various devices use illumination displays to provide information regarding the operation of the device. Such devices may include light emitting diodes (LEDs) to provide the illumination. An illumination display may use a liquid crystal display (LCD), for example, with LED backlighting. When these devices with illumination displays are used in direct sunlight, however, the LED backlight may be washed out and difficult to see.

One example of a device that uses an illumination display is an electronic chef's fork. Existing electronic chef's forks include LCD displays that show information, such as a temperature of food, and LED backlighting that changes color depending upon the food temperature. Conventional backlighting is often spread across an LCD surface area, which allows for more saturation and poor contrast. Because the electronic chef's fork is often used when cooking outdoors, the LED backlighting may be difficult to see and the user may be unable to determine when the colors have changed.

BRIEF DESCRIPTION OF THE DRAWINGS

These and other features and advantages will be better understood by reading the following detailed description, taken together with the drawings wherein:

FIG. 3 is a top plan view of an illumination display, consistent with a further embodiment of the present invention.

FIG. 4 is a bottom plan view of the illumination display shown in FIG. 3.

DETAILED DESCRIPTION

In general, an illumination display, consistent with embodiments of the present invention, includes a light transmitting panel that provides enhanced illumination edge lighting. One or more light sources are optically coupled into an edge of the light transmitting panel to illuminate the light transmitting panel. The light transmitting panel refracts and reflects light such that a greater intensity of light may be emitted from one or more enhanced illumination portions, such as a raised enhanced illumination portion, of the light transmitting panel. The light source(s) may emit light of different colors corresponding to different conditions such that the illumination display indicates a condition by illuminating the light transmitting panel with the color corresponding to the condition. The illumination display may be used in various devices including, but not limited to, a device for checking the temperature of food.

As used herein, the term "coupled" may refer to mechanical, optical and/or electrical coupling and does not imply a direct coupling or connection unless otherwise specified. As used herein, the term "optically coupled" refers to at least one coupled element being adapted to impart light to another coupled element directly or indirectly. As used herein, "reflect" refers to the redirection of at least a portion of incident radiation and does not require reflection of all radiation nor does it require reflection at any particular angle.

Figure 1:
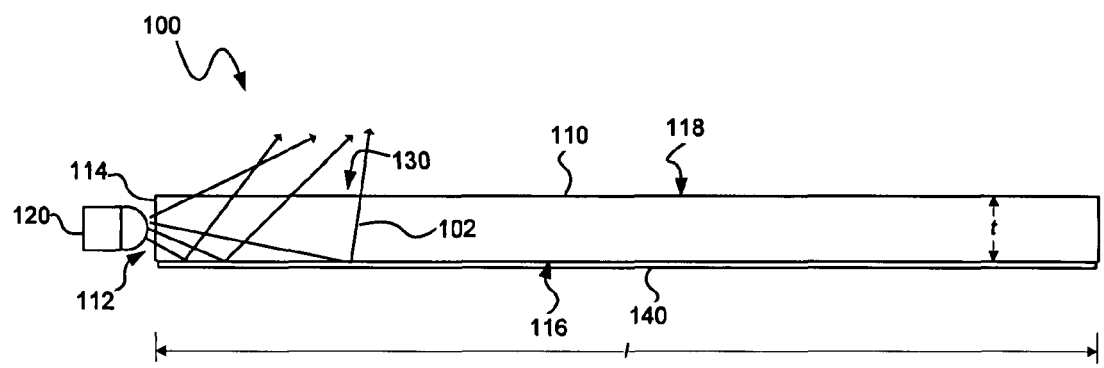
FIG. 1 is a side schematic view of an illumination display, consistent with an embodiment of the present invention.

Referring to FIG. 1, an illumination display 100 generally includes a light transmitting panel 110 and one or more light sources 120 optically coupled to the light transmitting panel 110. The light transmitting panel 110 includes one or more light coupling regions 112 at one or more locations along an edge 114 between front and back sides 116, 118 of the light transmitting panel 110. The light source 120 may be located at the light coupling portion 112 on the edge 114 such that the light emitted from the light source 120 is optically coupled into the light transmitting panel 110 via the edge 114. In particular, the light source 120 may be oriented at about 90° relative to the light transmitting panel 110. The light coupled into the light transmitting panel 110 may be refracted and/or reflected internally to illuminate the light transmitting panel 110. Because the edge 114 has a thickness t that is less than a length l of the sides of the light transmitting panel 110, the light coupled into the edge 114 is dispersed along a smaller surface area and experiences less scattering, for example, as compared to coupling light into the back side 116. Although the light source 120 is shown in the exemplary embodiment as directly coupling light into the light coupling region 112, other optical elements, such as lenses and/or optical coupling materials, may also be located between the light source 120 and the light coupling region 112.

One example of the light source 120 is a light emitting diode (LED) such as the type used to provide backlighting for a liquid crystal display (LCD) panel. In an embodiment, the light source(s) 120 may be configured to emit light of different colors, for example, in response to a condition such as a detected condition. Thus, the illumination display 100 may display information by displaying different colors of light indicating different conditions, as will be described in greater detail below. In other embodiments, the illumination display 100 may also include one or more display panels (not shown), such as LCD panels, for displaying information and the light transmitting panel 110 provides backlighting for the display panels and/or enhances illumination of the text on the display panels. The illuminated display 100 may also include other types of light sources including, but not limited to, an electroluminescent panel.

The light transmitting panel 110 includes one or more enhanced illumination portions 130 on the front side 118, for example, proximate the light coupling region 112. At least a portion of the light coupled into the light transmitting panel 110, as shown schematically by arrows 102, is directed to the enhanced illumination portion 130 and is emitted from the enhanced illumination portion 130. The light transmitting panel 110 may act as a lens or prismatic element that changes the direction and intensity of the light by bending or refracting the light rays such that a higher concentration of light is focused on the enhanced illumination portion 130.

The light transmitting panel 110 may further include a reflective material 140 on the back side 116 to facilitate reflection of the light within the light transmitting panel 110. A reflective material may also be disposed along the edge 114 (other than on the light coupling region 112) and/or on other portions of the light transmitting panel 110 that are not intended to emit light. Reflective materials known to those skilled in the art for use in optical applications may be used.

Figure 2:
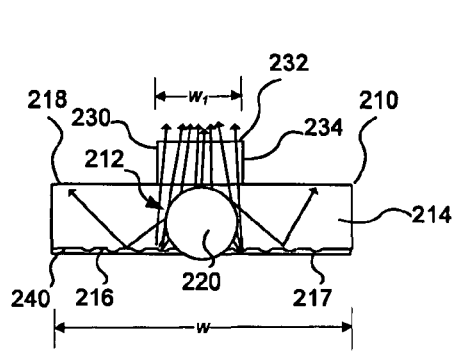
FIG. 2 is an end schematic view of an illumination display, consistent with another embodiment of the present invention.
Figure 2A:
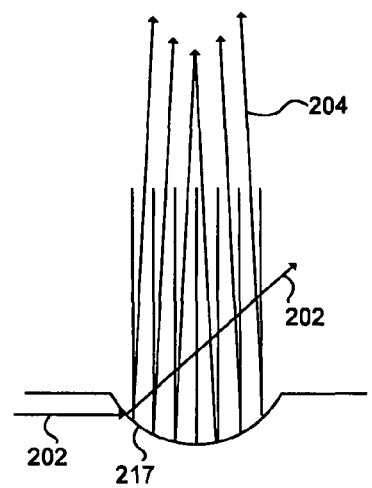
FIG. 2A is a side schematic view of light reflecting from a surface texture element in the illumination display of FIG. 2.

Referring to FIGS. 2 and 2A, another embodiment of a light transmitting panel 210 may include a raised enhanced illumination portion 230 extending from a front side, for example, proximate the light coupling region 212. At least a portion of the light coupled into the light transmitting panel 210, as shown schematically by arrows 202, is directed into the raised enhanced illumination portion 230 and is emitted from a top illumination surface 232 of the raised enhanced illumination portion 230. Light may also be emitted from a side surface 234 of the raised enhanced illumination portion 230, for example, to further illuminate text on a display panel as described below. The light transmitting panel 210 may act as a lens or prismatic element that changes the direction and intensity of the light by bending or refracting the light rays such that a higher concentration of light is focused in the raised enhanced illumination portion 230. The raised enhanced illumination portion 230 may thus act as a light pipe that carries and emits the higher concentration of light. Although the light coupling region 212 is shown below the raised enhanced illumination portion 230, the light coupling region 212 may also include an edge of the raised enhanced illumination portion 230 such that light is coupled directly into the raised enhanced illumination portion 230.

The width $w_1$ of the raised enhanced illumination portion 230 may also be less than the width w and/or length l of the sides of the light transmitting panel 210 such that the light directed into the raised enhanced illumination portion 230 is concentrated on a smaller surface area (i.e., the illumination surface 232) and does not disperse as much, for example, as compared to the surface of the front side 218. Thus, the intensity of the light emitted from the illumination surface 232 of the raised illumination portion 230 may be greater than an intensity of the light emitted from other portions of the light transmitting panel 210 (e.g., from the front side 218). In other words, the light from the enhanced illumination portion 230 is brighter and provides a higher contrast, which prevents it from being washed out or saturated by sunlight or other bright lighting. The raised enhanced illumination portion 230 may have various sizes, shapes and orientations relative to the light transmitting panel 210.

The light transmitting panel 210 may also include surface texturing 217 on the back side 216 to increase the surface area and help refract more light, making the illumination more consistent (e.g., across the front side 218). One example of the surface texturing 217 may include a series or array of convex elements, as shown in greater detail in FIG. 2A. The light source 220 may be positioned such that the surface texturing 217 (e.g., the convex elements) is in the line of site of the light source 220, thus refracting light as indicated schematically by arrows 202. The convex shape may also focus the internally reflected light, as indicated schematically by arrows 204. Although the surface texturing 217 is shown as a series or array of convex elements, elements of other shapes, sizes and numbers may also be used to provide the surface texturing 217 that increases the surface area. In particular, the elements of the surface texturing 217 may also be concave depressions that increase the surface area and help to refract the light more consistently. A combination of convex and concave elements (or other types of surface texturing elements) may also be used. In other embodiments, the back side 216 may be a smooth surface with no surface texturing. A reflective material 240 may be provided over the surface texturing 217.

Referring to FIGS. 3-6, another embodiment of an illumination display 300 is described in greater detail. The illuminate display 300 includes a light transmitting panel 310 and light sources 320, 322, such as LEDs, coupling light into an edge of the light transmitting panel 310 at each end. In this embodiment, the light transmitting panel 310 includes recesses 313, 315 that receive the light sources 320, 322. The illumination display 300 may also include other numbers of light sources in other locations around the edge of the light transmitting panel 310.

The light transmitting panel 310 includes a raised enhanced illumination portion 330 extending from the panel 310 proximate one of the light sources 320. In this embodiment, the raised enhanced illumination portion 330 forms at least a partial border around a subsection of the light transmitting panel 310 (e.g., three sides of a rectangular shape). The light transmitting panel 310 may direct light into the raised enhanced illumination portion 330, for example, as described above. Other shapes and configurations of raised enhanced illumination portions may also be used. In particular, a raised enhanced illumination portion may also extend around a portion of or the entire perimeter of a light transmitting panel.

The light transmitting panel 310 may also include surface texturing 317, such as an array of convex elements, over at least a portion of a back side 316 and in the line of site of the light source 320, as discussed above. The light transmitting panel 310 may be recessed on the back side 316 such that the surface texturing 117 is in the line of site of the light source 320. When the exemplary embodiment of the illumination display 300 is illuminated, the surface texturing 117 helps to refract the light and provide more consistent illumination. The surface texturing 117 also appears as illuminated "dots" in the raised enhanced illuminated portion 330. The surface texturing may also have other shapes and configurations and may be located along other sides or regions of the light transmitting panel.

Figure 5:
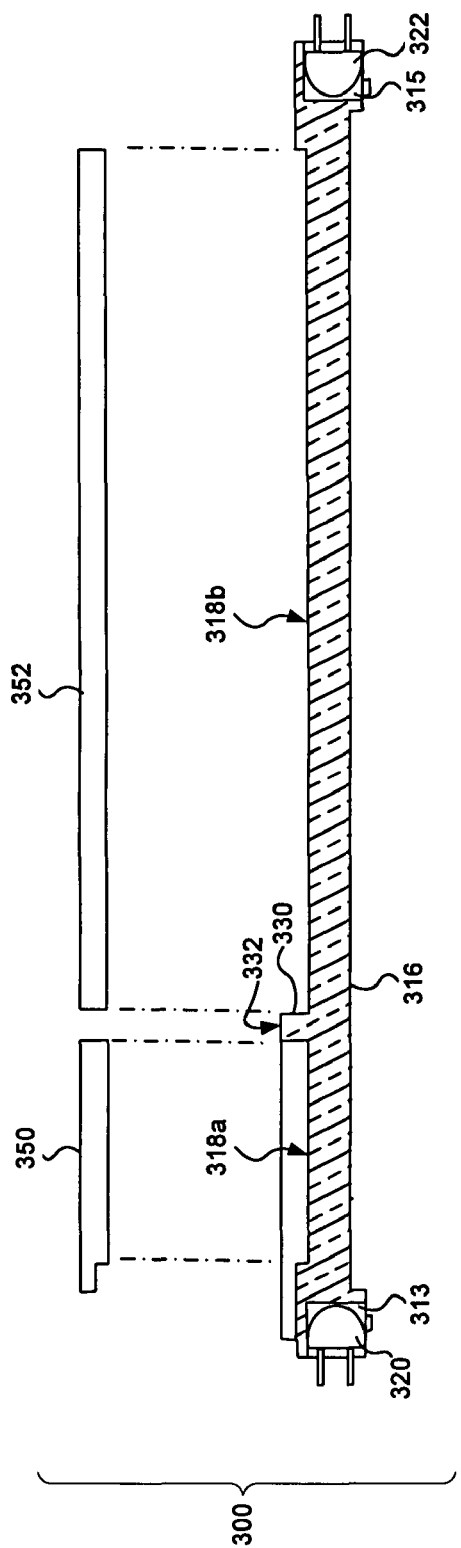
FIG. 5 is an exploded side cross-sectional view of the illumination display taken along line 5-5 in FIG. 4 together with display panels.
Figure 6:
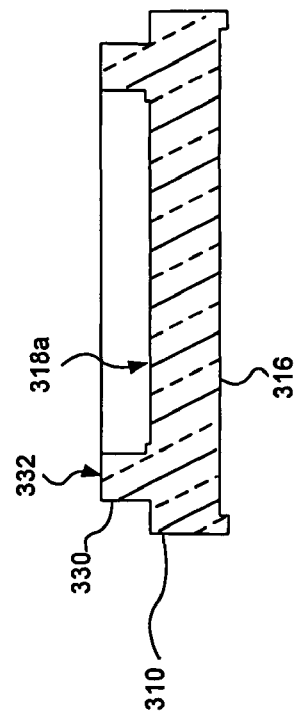
FIG. 6 is an end cross-sectional view of a light transmitting panel in the illumination display taken along line 6-6 in FIG. 3.

The light transmitting panel 310 includes display panel receiving regions 318a, 318b configured to receive display panels 350, 352, such as LCD panels (FIG. 5). The light transmitting panel 310 provides backlighting to the display panels 350, 352 in the regions 318a, 318b. In the exemplary embodiment, the raised enhanced illumination portion 330 extends above the regions 318a, 318b and provides a frame or border around at least a portion of one of the display panels 350. The raised enhanced illumination portion 330 thus provides an illumination surface 332 that is not covered by the display panels 350, 352 and emits the light directly (and with a higher contrast) without being impeded by the display panels 350, 352. By forming a frame or border around the display panel 350, the raised enhanced illumination portion 330 may also enhance illumination of the text displayed on the display panel 350.

The light transmitting panel 310 may be made of transparent materials known to those skilled in the art. One example of the material may include a polycarbonate, acrylic, acrylonitrile butadiene styrene (ABS), or other suitable material used for lenses or light transmitting elements. The transparent material may have an index of refraction, for example, in a range of about 1.4 to 1.6. In an embodiment, the light transmitting panel 310 may be generally rectangular shaped, although the light transmitting panel 310 may also have other shapes, for example, depending upon the shapes of the LCD panel(s). The dimensions of the light transmitting panel 310 generally depend on the size of the apparatus and display in which it is used.

Figure 7:
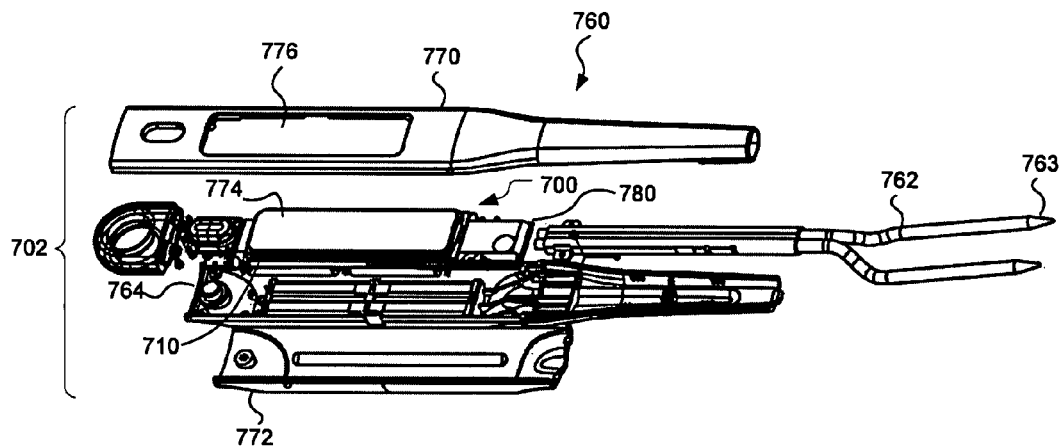
FIG. 7 is an exploded perspective view of an electronic chef's fork including an illumination display, consistent with a further embodiment of the present invention.
Figure 8:
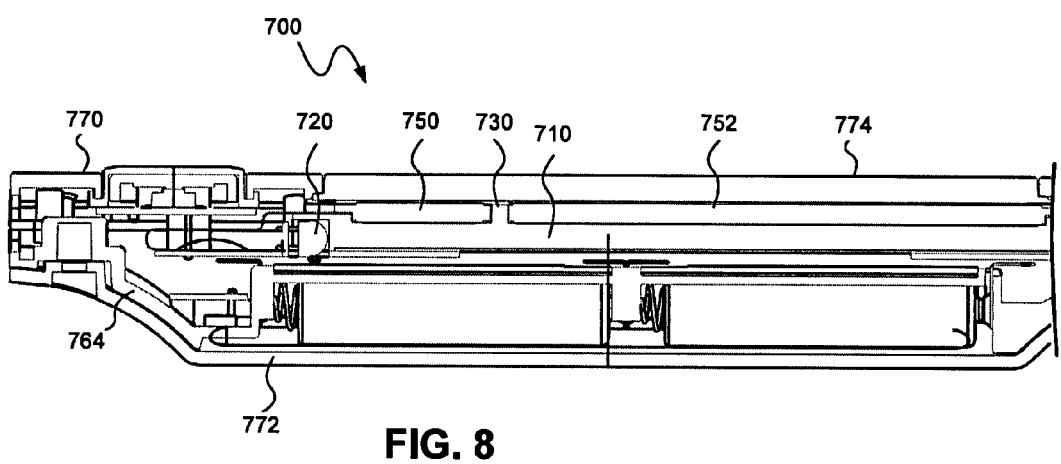
FIG. 8 is a side cross-sectional view of the illumination display in the electronic chef's fork shown in FIG. 7.

As shown in FIGS. 7 and 8, an illumination display 700, such as the type described herein, may be used in an electronic chef's fork 702, consistent with a further embodiment. The electronic chef's fork 702 generally includes a handle portion 760 coupled to a piercing element 762. The handle portion 760 may include a body portion 764 that acts as a display mounting portion and holds the illumination display 700. The handle portion 760 may also include front and back cover portions 770, 772 secured over the body portion 764. The piercing element 762 may be secured between the front cover 770 and the body portion 764. A window 774 may be positioned over the illumination display 700 and received within an opening 776 in the front cover 770 such that the illumination display may be visible on the handle portion 760.

One or more temperature sensors (not shown) may be thermally coupled to the piercing element 762 to sense a temperature of an item (e.g., a food item) contacting the piercing element 762. Temperature sensors may be located, for example, in the tips 763 of the piercing element 762. The chef's fork 702 may also include an electronic control circuit 780, such as one or more circuit boards, coupled to the temperature sensor and/or to the illumination display 700. The electronic circuit 780 may control the illumination display 700 in response to the sensed temperatures, for example, by causing the illumination display to change colors and display temperature and/or cooking information.

Similar to the embodiment described above and shown in FIGS. 3-6, the illumination display 700 may include a light transmitting panel 710 with a raised enhanced illumination portion 730 and a LED 720 at each end of the transmitting panel 710 (only one LED is shown in FIG. 8). The LEDs 720 are capable of emitting light of different colors, and the light is coupled into the light transmitting panel 710 and emitted from the raised enhanced illumination portion 730. The electronic circuit 780 may be coupled to the LEDs 720 to cause the LEDs to emit different colors of light in response to different sensed temperatures.

LCD panels 750, 752 may be received in the light transmitting panel 710 such that the light transmitting panel 710 also provides backlighting to the LCD panels 350, 352. The electronic circuit 780 may be coupled to the LCD panels 750, 752 to cause the LCD panels 750, 752 to display information such as temperature, a type of food, and a level of "doneness" for the type of food. The raised enhanced illumination portion 730 may also provide additional illumination of the text displayed on the display panel 750 to make the text easier to read.

Examples of electronic chef's forks in which an illumination display may be used are described in greater detail in U.S. Pat. Nos. 5,983,783; 6,065,391; and 7,104,682, which are fully incorporated herein by reference. Although the exemplary embodiment shows a chef's fork, an illumination display, consistent with the embodiments described herein, may also be used in other devices to enhance visibility in sunlight or other types of bright lighting (e.g., a bright fluorescent light). For example, an illumination display may be used in other cooking thermometer devices and in tire pressure gauge devices such as the type disclosed in U.S. Pat. No. 7,013,722, which is fully incorporated herein by reference.

Accordingly, the enhanced illumination edge lighting provided by the illumination display, consistent with the embodiments described herein, facilitates visibility of the color changing backlight in devices that use different color light to provide information.

Consistent with one embodiment, an illumination display includes a light transmitting panel having sides and an edge. The edge of the panel includes at least one light coupling portion and at least one of the sides includes at least one enhanced illumination portion. The illumination display further includes at least one light source optically coupled into the light coupling portion of the edge of the light transmitting panel. The light transmitting panel is configured to refract and reflect the coupled light such that an intensity of the light emitted from the at least one enhanced illumination portion is greater than an intensity of the light emitted from other portions of the light transmitting panel.

Consistent with another embodiment, an apparatus for determining food temperature includes a piercing element, a temperature sensor thermally coupled to the piercing element and configured to sense a temperature of an item contacting the piercing element, and a handle portion coupled to the piercing element. The apparatus also includes an illumination display integral with the handle portion. The illumination display includes a light transmitting panel having sides and an edge. The edge of the panel includes at least one light coupling portion and at least one of the sides includes at least one enhanced illumination portion. The illumination display further includes at least one light source optically coupled into the light coupling portion of the edge of the light transmitting panel. The light transmitting panel is configured to refract and reflect the coupled light such that an intensity of the light emitted from the at least one enhanced illumination portion is greater than an intensity of the light emitted from other portions of the light transmitting panel. The at least one light source is configured to emit light of different colors in response to a level of the temperature sensed by the temperature sensor.

Consistent with a further embodiment, an apparatus includes a display mounting portion and an illumination display mounted in the display mounting portion. The illumination display includes a light transmitting panel having sides and an edge. The edge of the panel includes at least one light coupling portion and at least one of the sides includes at least one enhanced illumination portion. The illumination display further includes at least one light source optically coupled into the light coupling portion of the edge of the light transmitting panel. The light transmitting panel is configured to refract and reflect the coupled light such that an intensity of the light emitted from the at least one enhanced illumination portion is greater than an intensity of the light emitted from other portions of the light transmitting panel. The at least one light source is configured to emit light of different colors representing information.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An illumination display comprising:
   a light transmitting panel having sides and an edge, wherein the edge of the panel includes at least one light coupling portion and wherein at least one of the sides includes at least one enhanced illumination portion, wherein the enhanced illumination portion includes a raised enhanced illumination portion extending from one of the sides proximate the light coupling portion of the edge;

at least one light source optically coupled into the light coupling portion of the edge of the light transmitting panel, wherein the light transmitting panel is configured to refract and reflect the coupled light such that an intensity of the light emitted from the at least one enhanced illumination portion is greater than an intensity of the light emitted from other portions of the light transmitting panel; and at least one liquid crystal display (LCD) panel disposed on at least a portion of the light transmitting panel other than the raised enhanced illumination portion, wherein the light transmitting panel is configured to provide backlighting for the LCD panel, and wherein the raised enhanced illumination portion forms a frame around at least a portion of the LCD panel.

2. The illumination display of claim 1 wherein the light source includes a light emitting diode (LED).

3. The illumination display of claim 1 wherein the light coupling portion is below the raised enhanced illumination portion.

4. The illumination display of claim 1 wherein the light transmitting panel includes surface texturing on at least a portion of one of the sides opposite the enhanced illumination portion configured to emit the light, the surface texturing providing an increased surface area in a line of site of the light source.

5. The illumination display of claim 1 wherein the at least one light source includes a plurality of light sources coupled into respective light coupling portions at different locations on the edge of the light transmitting panel.

6. The illumination display of claim 1 wherein the light transmitting panel is made of a material with a refractive index in the range of about 1.4 to 1.6.

7. The illumination display of claim 1 wherein the light transmitting panel is made of polycarbonate.

8. The illumination display of claim 1 wherein the light transmitting panel is made of a material selected from the group consisting of acrylic, polycarbonate, and ABS.

9. The illumination display of claim 1 wherein the at least one light source is configured to emit light of different colors in response to different conditions.

10. The illumination display of claim 1 wherein the light transmitting panel includes a reflective material disposed on at least a back side of the light transmitting panel.

11. An apparatus for determining food temperature, the apparatus comprising:

a piercing element;

a temperature sensor thermally coupled to the piercing element and configured to sense a temperature of an item contacting the piercing element;

a handle portion coupled to the piercing element; and an illumination display integral with the handle portion, the illumination display comprising:

a light transmitting panel having sides and an edge, wherein the edge of the panel includes at least one light coupling portion and wherein at least one of the sides includes at least one enhanced illumination portion, wherein the enhanced illumination portion includes a raised enhanced illumination portion extending from one of the sides proximate the light coupling portion of the edge;

at least one light source optically coupled into the light coupling portion of the edge of the light transmitting panel, wherein the light transmitting panel is configured to refract and reflect the coupled light such that an intensity of the light emitted from the at least one enhanced illumination portion is greater than an intensity of the light emitted from other portions of the light transmitting panel, and wherein the at least one light source is configured to emit light of different colors in response to a level of the temperature sensed by the temperature sensor; and at least one liquid crystal display (LCD) panel disposed on at least a portion of the light transmitting panel other than the raised enhanced illumination portion, wherein the raised enhanced illumination portion forms a frame around at least a portion of the LCD panel.

12. The apparatus of claim 11 wherein the LCD panel is configured to display at least a temperature.

13. The apparatus of claim 11 wherein the light transmitting panel includes surface texturing on at least a portion of one of the sides opposite the enhanced illumination portion configured to emit the light, the surface texturing providing an increased surface area in a line of site of the light source.

14. The apparatus of claim 11 wherein the at least one light source includes a plurality of light sources coupled into respective light coupling portions at different locations on the edge of the light transmitting panel.

15. An apparatus comprising:

a display mounting portion; and an illumination display mounted in the display mounting portion, the illumination display comprising:

a light transmitting panel having sides and an edge, wherein the edge of the panel includes at least one light coupling portion and wherein at least one of the sides includes at least one enhanced illumination portion, wherein the enhanced illumination portion includes a raised enhanced illumination portion extending from one of the sides proximate the light coupling portion of the edge;

at least one light source optically coupled into the light coupling portion of the edge of the light transmitting panel, wherein the light transmitting panel is configured to refract and reflect the coupled light such that an intensity of the light emitted from the at least one enhanced illumination portion is greater than an intensity of the light emitted from other portions of the light transmitting panel, and wherein the at least one light source is configured to emit light of different colors representing information; and at least one liquid crystal display (LCD) panel disposed on at least a portion of the light transmitting panel other than the raised enhanced illumination portion, wherein the raised enhanced illumination portion forms a frame around at least a portion of the LCD panel.

16. The apparatus of claim 15 further comprising a sensor configured to sense conditions, and wherein the at least one light source is configured to emit light of different colors in response to different conditions sensed by the sensor.

* * * * *